Figure 1:
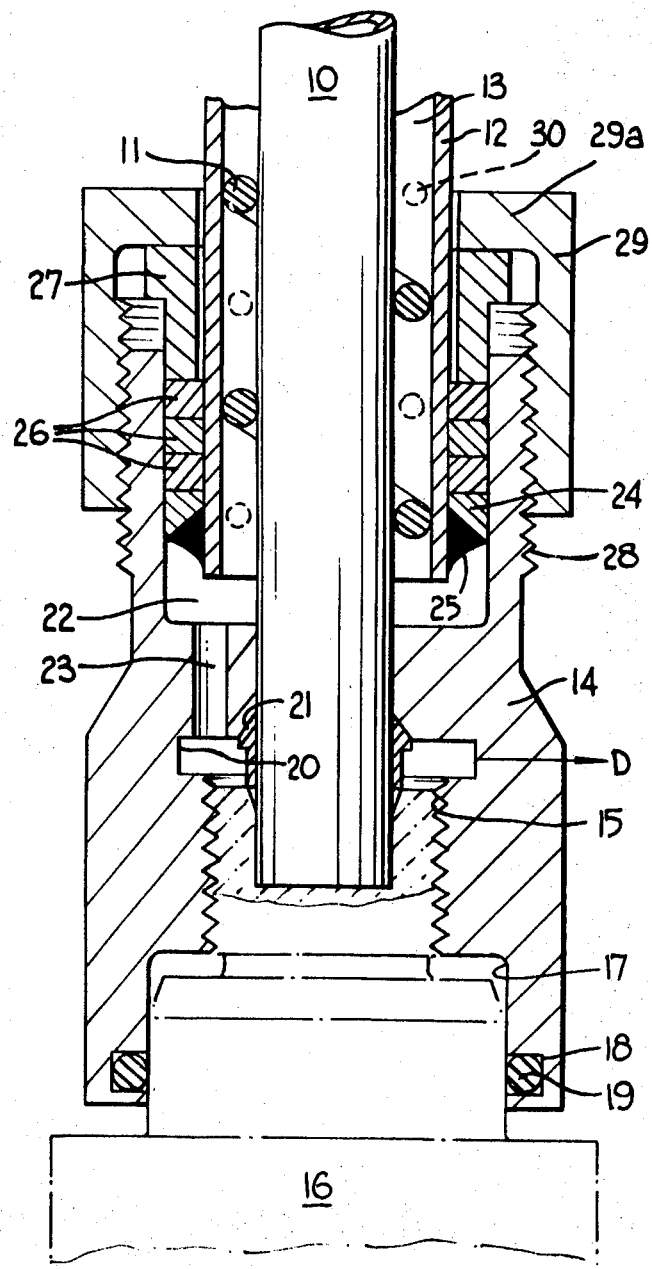

United States Patent

[11] 3,612,577

| [72] | Inventors | Joseph Albert Pope<br>Birmingham, England;<br>Colin William Dawson, Cooksville, Ontario,<br>Canada |
|---|---|---|
| [21] | Appl. No. | 872,062 |
| [22] | Filed | Oct. 29, 1969 |
| [45] | Patented | Oct. 12, 1971 |
| [73] | Assignee | Mirrlees Blackstone Limited |
| [32] | Priority | Oct. 30, 1968 |
| [33] | | Great Britain |
| [31] | | 51351/68 |

[54] CONCENTRIC PIPES WITH DRAIN MEANS
3 Claims, 2 Drawing Figs.

[52] U.S. Cl..................................... 285/14,
 285/41, 285/138, 285/348
[51] Int. Cl........................................ F16l 55/00
[50] Field of Search........................... 285/13, 14,
 41, 133, 138, 348, 148; 138/112, 113, 114, 33

[56] References Cited
UNITED STATES PATENTS

| 607,180 | 7/1898 | Landis | 285/348 X |
| 1,140,864 | 5/1915 | Aubery | 138/33 |
| 2,020,860 | 11/1935 | Touborg | 138/114 X |
| 2,838,074 | 6/1958 | Lauck | 285/133 |
| 2,983,506 | 5/1961 | Bertsch et al. | 285/133 X |
| 3,079,179 | 2/1963 | Niemoth | 285/133 |
| 3,489,435 | 1/1970 | Weber et al. | 285/13 |

FOREIGN PATENTS

| 1,011,346 | 4/1952 | France | 285/133 |

*Primary Examiner*—Dave W. Arola
*Attorneys*—Harry C. Bierman, Jordan B. Bierman and Bierman and Bierman ABSTRACT: The invention provides a concentric circular pipe assembly particularly suited for the conveyance of fuel oil under pressure to engines. The inner pipe is used to convey the fuel oil and the outer pipe is provided as a leak jacket to collect and drain away safely any oil escaping from the inner pipe. Between the inner and outer pipes there is provided an expanded helical member which is close fitting about the inner pipe and close-fitting in the outer pipe so that both pipes derive support from one another over helical line contact and this permits bending of the pipes without significant loss of circularity or concentricity and also permits drainage of fluid from the outer pipe. The pipes are terminated with concentric connectors through one of which fluid in the outer pipe can drain.

Joseph Albert Pope
Colin William Dawson INVENTORS

Joseph Albert Pope & Colin William Dawson INVENTORS

BY Bierman & Bierman, ATTORNEYS.

CONCENTRIC PIPES WITH DRAIN MEANS

This invention concerns pipes and in particular though not exclusively pipes in which a fluid medium such as oil or a gas is to be conveyed under pressure.

There exist many situations in which it is necessary to convey fluids from place to place and in which if the pipe containing the fluid were to become fractured serious danger would arise to persons, plant or machines in the vicinity of the fracture. One such situation for example exists in relation to the provision of combustible liquid to engines under pressure. It will be appreciated that such liquid is fed under pressure and also as in some cases in close proximity to hot engine parts such as the exhaust manifold or exhaust pipes. When a fuel pipe fractures there is therefore a serious fire risk. In other cases, for example the conducting of hot; corrosive; toxic or other harmful gases or liquids the danger exists even if these gases or liquids are not under high pressure that if the pipe becomes fractured danger exists not only to equipment but also personnel.

In addition to the cases above referred to there are situations in which it is necessary to, for example, convey two different fluids separately in confined spaces and difficulty may be experienced in conducting these separate fluid pipes through the available space; additionally it may be necessary in some cases to convey fluids at different pressures and in practice long runs of pipes may be required to avoid confined spaced through which two pipes could not be passed, in such a situation pipe costs are high.

Practical experience has shown that other situations arise in which difficulties occur in conveying fluids from place to place, for example in some cases the fluid is to be kept in a heated or cooled condition and it is necessary to employ lagging to prevent heat loss, such lagging of course increases effective pipe diameter and also costs.

Whilst in the case of straight runs of pipe it is possible to locate one pipe within another partially to overcome some of the difficulties briefly referred to above, it is difficult to ensure that concentricity of the pipes is maintained and also it is not easy to clamp these pipes since the result of clamping the pipes results in nonconcentricity and thus possible blockage of the outer pipe or conversely the inability securely to hold the pipes which can cause chafing due to vibrations, and thus increase the risk of fracture of at least the outer pipe and possibly the inner. Additionally if the pipes are to be bent it is often impossible to achieve this with concentric pipes.

The object of the present invention is to provide a pipe which overcomes or at least substantially overcomes the above outlined difficulties, and others known to pipe users, in a simple and effective manner.

According to the present invention a pipe arrangement for conveying fluid comprises an inner pipe and an outer pipe held in concentric arrangement on straight and bent sections by the incorporation between the pipes of a helix of relatively rigid material, such as a metallic or other material spring, whereby fluid can flow in the inner and/or the outer pipes as required.

Figure 2:
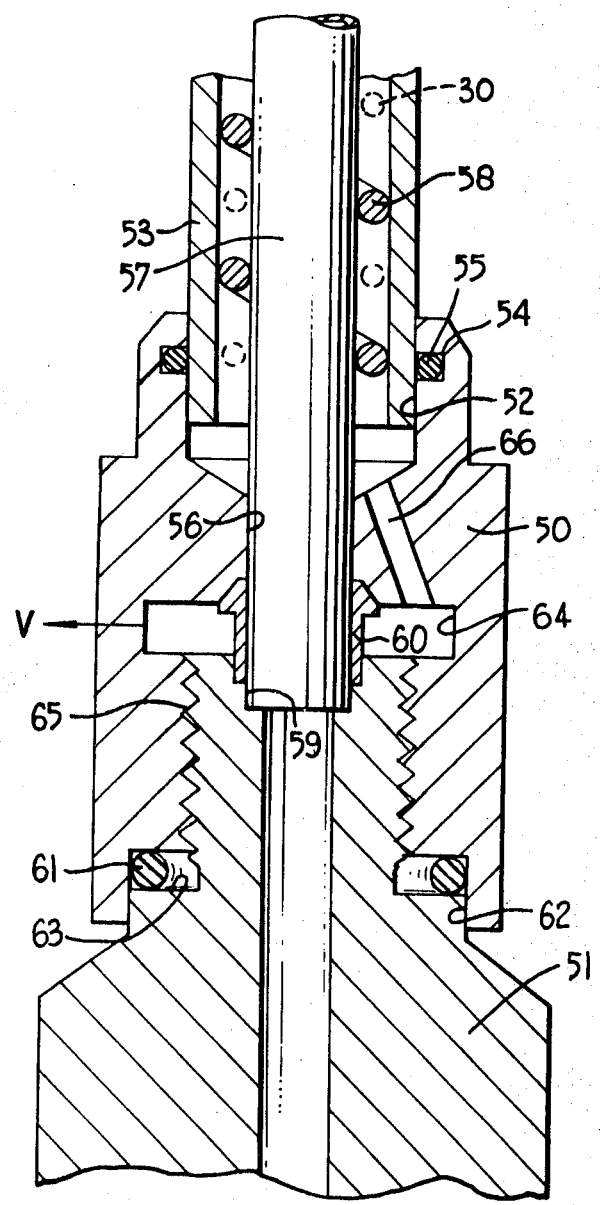

The invention will be described further by way of example only, with reference to two practical forms thereof and the accompanying drawings in which:

FIG. 1 shows in part section a pipe construction made in accordance with the invention and one from of connector adapted for use in a high pressure system; and FIG. 2 is a view similar to FIG. 1 showing an alternative form of connector for use in a lower pressure system.

In the following description a pipe arrangement for the conveying of combustible liquid to an engine will be referred to but this is not intended to limit the invention to this use only.

To produce a pipe arrangement according to the invention, there is provided an inner pipe 10 which is of relatively thick-walled construction adapted to carry liquid under pressure. About this pipe is located a helical spring 11 which supports an outer pipe 12 of smaller wall thickness. The spring 11 is a good fit in the space 13 between the pipes 10 and 12. Such a pipe assembly can, it is found, be bent into complex shapes without risk of disturbing the concentricity of the two pipes by virtue of the support given to the pipes by the spring.

For use of the pipe arrangement in fuel lines it is necessary to feed fuel down the bore of the inner pipe 10 only but the presence of the outer pipe 12 eliminates the danger, in the event of fuel pipe fracture, of fuel spraying onto hot engine parts in the vicinity of the fracture and thus fire risk is eliminated. Fuel which escapes from the fracture may be led to a drain or reservoir within the space between the inner pipe 10 and the outer pipe 12 in a helical path between the convolutions of the spring 11. Such a pipe arrangement is of particular use in fuel injection engines where high fuel pressures are common. The pipe assembly can safely be firmly clamped at the requisite positions to the engine since clamping pressure on the outer pipe 12 will not, due to the presence of the spring 11, collapse it, nor will the concentricity of the pipes be disturbed. The inner pipe 10 will also be firmly held by the clamping pressure, again due to the pressure of the spring 11 which transmits clamp pressure to the inner pipe 10.

It is convenient to arrange for the union attachments of the pipe to be such that leakage from a badly fitting or fractured connection of the inner pipe is eliminated and for this purpose there is provided a connection which holds both the inner and the outer pipes. This connection comprises, at for example the fuel pump discharge union, the provision of a connector unit 14 which has a threaded bore 15 adapted to receive the fuel pump discharge union 16 (indicated in chain line). Conveniently the union 14 has an enlarged bore 17 at its free end to accommodate part of the fuel pump union 16 and within this bore 17 is a groove 18 which accommodates an O-ring sealing member 19. At the inner end of the bore 15 is a groove 20 which, as indicated by the arrow D, is provided with an outlet to drain or to a reservoir. The inner pipe 10 is of such a length as to seat within the bore of the pump union 16 and a collar-sealing member 21 is provided around the pipe 10 to locate within the bore of the union 16. Extending from the groove 20 to a counter bore 22 of the connector unit 14 is a drain hole 23. The counter bore 22 is of such a diameter as to accommodate the outer pipe 12 with a clearance into which is located a high-pressure seal. The high-pressure seal includes a ring 24 which is welded to the outer pipe 12 adjacent its end. The ring 24 has an angular face to facilitate the provision of the welding material 25. Adjacent the ring 24 and at the side thereof remote from the weld are a series of compressible packing rings 26 against which abuts the end of an externally flanged collar 27. The diameter of the collar is such as it will overlie the end face of the connector unit 14. The diameter of the collar is such as it will overlie the end face of the connector unit 14. The connector unit 14 is externally screw threaded over part of its length (as shown at 28) to receive an internally screw-threaded and internally flanged sleeve 29. The internal flange 29a of the sleeve 29 overlies the flange of the collar 27 and thus as the sleeve 29 is tightened onto the connector unit 14 the seals 26 are pressed tightly onto the ring 24 and thus deformed to produce a strong seal between the outer pipe 12 and the wall of the counter bore 22.

In certain cases, for example where the pressures in the inner pipe 10 may not be extremely high it is possible to use a connecting means of a somewhat less robust nature as shown in FIG. 2. In this arrangement there is provided a connector unit 50 adapted to have screwed therein, for example, a liquid or gas discharge union 51. The connector 50 is provided with a bore 52 into which is fitted the end of an outer pipe 53. To provide a seal between the connector 50 and the outer pipe 53 the connector is internally grooved as at 54 to receive an O-ring seal 55. The bore 52 is reduced in diameter at its inner end to provide a bore 56 which serves to receive the end region of an inner pipe 57 spaced from the outer pipe 53 by means of a helical spring 58.

The inner pipe 57 passes through the connector 50 beyond the end of the outer pipe 53 to seat in a bore 59 the union 51 and surrounding the inner pipe 57 at this point is a sleeve 60 which firmly compresses into the bore 59 of the union 51 to provide a seal. Additionally an O-ring seal 61 is provided in an enlarged end bore 62 of the connector 50 which receives the union 51. The union 51 is stepped as at 62 to form a seat 63 for the O-ring 61. An annular internal groove 64 is provided in the connector 50 adjacent the inner end of its screw thread 65 and by means of a communicating bore 66 a connection is made between the end of the bore 52 which receives the outer pipe 53 and the groove 64. The groove 64 forms a chamber which is vented to a reservoir or receiving tank, as indicated by the arrow V, into which fluid, which flows down the outer pipe in the event of an internal pipe fracture can flow.

Clearly there are uses for the pipe arrangements described above other than those specifically referred to. For example, the arrangement can be used for conveying gas under pressure, or for conveying two media, both liquid, both gas, or gas and liquid simultaneously whether the liquids or gases are under pressure or not.

It is also convenient to provide means for ascertaining whether the inner pipe has fractured since this is not visible and there are different ways in which this can be achieved.

For example, if the outer pipe does not normally carry liquid or gas then if the reservoir or drain chamber is provided with a float the return flow of fluid will affect its position and this can be used to actuate an alarm which may be in the form of a warning light or audible signal. Alternatively the outer pipe may contain a liquid or gas under low pressure which, in the event of a fracture will be increased due to the additional liquid or gas from the inner pipe and this increase in pressure can be used to actuate a pressure sensitive alarm system.

It is also possible to use the outer pipe of either pipe assembly as a sheath for a heating element for the fluid within the inner pipe, such heating element being in the form of an electrical resistance wire 30 (indicated in broken line). Alternatively, heating can be achieved by the use of a hot liquid or gas. Conversely it may carry a cooling medium if liquid or gas in the inner pipe is to be kept cool or colled during its passage along the inner pipe.

Whilst in FIG. 1 the O-ring seal 19 is shown located within a groove in the connector ring 14 it is possible, and in face desirable to form a groove in the wall of the union 16 to receive the O-ring. It will be appreciated that it is a more simple matter to produce a groove on an external face than to produce a groove on an internal face of a component.

We claim:

1. A pipe arrangement for conveying fluids comprising a circular cross section inner pipe, a circular cross section outer pipe in spaced concentric relationship with said inner pipe, a helical member of circular cross section between said inner and outer pipes, the coils of the helical member being spaced apart and defining an internal diameter close fitting about said inner pipe and an external diameter close fitting in said outer pipe so as to hold the pipes in said spaced concentric relationship, a first connector on the inner pipe for connection to a source supplying fluid at pressure thereto and a second connector on the outer pipe concentric with said first connector and in fluid communication with the space between said inner and outer pipes, for draining fluid escaping from the inner pipe into the outer pipe, and means defining a drain vent from the space between said inner and outer pipes through at least one of said connectors to the exterior thereof.

2. A pipe arrangement as claimed in claim 1 having a helical electrical heater interlayed with the coils of said helical member.

3. A pipe arrangement as claimed in claim 1 wherein said first and second connectors comprise a unitary piece having opposed bores, one bore being threaded and carrying a seal for sealing engagement with said source which includes a fuel pump discharge union and the other bore being unthreaded and carrying a seal sealing with the outside of said outer pipe and providing a drain sump in fluid communication with said vent for fuel draining from the outer pipe.